United States Patent [19]

Martinson et al.

[11] 4,284,026
[45] Aug. 18, 1981

[54] MOORING DEVICE

[75] Inventors: Charles M. Martinson; David J. Martinson, both of Stanwood, Wash.

[73] Assignee: Mar-Fam, Inc., Stanwood, Wash.

[21] Appl. No.: 128,721

[22] Filed: Mar. 10, 1980

[51] Int. Cl.³ .............................................. B63B 21/20
[52] U.S. Cl. .................................................. 114/230
[58] Field of Search ............... 114/230, 231, 263, 267

[56] References Cited

U.S. PATENT DOCUMENTS

| | | | |
|---|---|---|---|
| 3,155,069 | 11/1964 | Ross | 114/230 |
| 3,187,706 | 6/1965 | Ross | 114/230 |
| 3,307,514 | 3/1967 | Young | 114/230 |
| 3,442,245 | 5/1969 | Christians et al. | 114/230 |
| 3,592,442 | 7/1971 | Zumbo | 254/77 |
| 3,763,816 | 10/1973 | Wilson, Jr. | 114/230 |
| 3,783,816 | 1/1974 | de Chassy et al. | 114/230 |
| 3,834,336 | 9/1974 | Peters | 114/267 |
| 3,938,462 | 2/1976 | Brandt | 114/230 |

*Primary Examiner*—William A. Cuchlinski, Jr.

[57] ABSTRACT

An economical, space saving, durable, rot and corrosion resistant mooring device for mooring a boat while allowing full articulation. An adjustable base unit allows vertical adjustment of the basic mooring unit to account for varying freeboard of the dock and for required flotation assistance. Stationary landing arms and stationary landing arm uprights support a resilient stretch member allowing the bow of the boat to be craddled while the stern lines and dock cleats allow the tensioning of the boat in the mooring device thus allowing full articulation while severely limiting any pivotal action of the boat in response to wind and wave action.

11 Claims, 7 Drawing Figures

MOORING DEVICE

BACKGROUND OF THE INVENTION

Field of the Invention

The present invention relates to mooring boats, and more particularly to the mooring of boats bow forward wherein the body of the boat lies perpendicular to either a fixed or floating dock and wherein the boat is allowed full articulation independent of the dock.

As is well known, many new commerical and pleasure boats are produced each year. Furthermore, there are in existence in the United States, many hundreds of thousands of both commerical and pleasure craft. Due to the vast number of boats, the moorage to service them is a problem of major proportions. In the past years there was a high degree of availability of natural protected harbors allowing utilization as the need arose. Next came man made development of harbors lacking natural protection. The problem with which we are now faced is that in many cases it is no longer economically or environmentally sound for man made development to continue as in the past, while the demand for additional moorage has not slackened. Therefore, it becomes encumbant upon moorage developers to utilize every last available space in either new or refurbished marinas.

One solution to the moorage problem is the rapidly developing area of dry moorage. In this instance a boat is stored on land until the owner wishes to use the vessel, at which time it is lifted, via large machinery, from its storage point and placed in the water for use. While this is in and of itself a good partial solution to the moorage problem it has its drawbacks. First, there is only a limited amount of land available for this type storage. Second, the economics of this type storage require storage fees equal to or in excess of moorage fees. Third, the weekend boaters seem to want the use of their boat on Friday evening and to return Sunday evening, which creates congestion causing a substantial wait for the boat owner each time.

Wet moorage of vessels by utilization of a mooring buoy is probably the oldest and least damaging method of mooring for the boat. The problems with this system today are readily apparent, for example, the transportation between the mooring buoy and land and the amount of water surface space required for each boat.

Another solution to the problem of moorage was developed by Ross in 1965 in U.S. Pat. No. 3,187,706 granted June 8th, disclosing a semi-articulated mooring apparatus requiring a large finger pier between boats or the boat to be moored parallel to the main dock walkway.

U.S. Pat. No. 3,763,816 granted Oct. 9, 1973, to Wilson, Jr. discloses a concept similar to the Ross patent. In Wilson, Jr., a boat is moored in a semi-articulated mooring apparatus requiring a separate finger pier on each side of the boat as a mounting device for the docking apparatus.

U.S. Pat. No. 3,938,462 granted Feb. 17, 1976, to Brandt discloses a mooring apparatus with two separate support elements permanently affixed to a support platform and positioned so as to respectively lie on opposite sides of the said boat and with a spacing there between greater than the maximum expected beam of a boat to be moored at said apparatus. Mounted on the support elements are two support members for tensioning lines from the vessel. Additionally, there is at least one elastic stretch member mounted between said support elements.

SUMMARY OF THE INVENTION

It is an object of the present invention to provide the most space and cost efficient method of mooring boats in either the construction of new marinas or the renovation of existing facilities thereby conserving our natural or man made waterways.

Essentially, the basic mooring device of the present invention comprises a base unit which is permanently and rigidly affixed to an existing floating or fixed base landing structure. Attached to the base unit is an adjustable base unit allowing for the vertical adjustment of the mooring device depending on the freeboard of either the fixed or floating base landing structure. Rigidly attached to the adjustable base unit are the stationary landing arms which are parallel to the water and rigidly mounted to the stationary landing arms are the four stationary landing arm uprights which are perpendicular to the stationary landing arms. Mounted between the stationary landing arms and attached to the stationary landing arm uprights is at least one resilient stretch member. Fastening means securely hold a flotation device in place under a portion of each stationary landing arm providing flotation equal to or in excess of the weight of the total mooring device. Further, two dock cleats are mounted on the floating or fixed base landing structure which spacing is determined by the length and width of the moored boat.

In the preferred form, the base unit, adjustable base unit, stationary landing arms, stationary landing arm uprights, and dock cleats consist of formed metal components. The resilient stretch member may be an ethalene propalene rubber which is resistant to both water, ozone and ultraviolet rays. In the preferred form, the flotation consists of foam filled tire casings as described in U.S. Pat. No. 3,834,336 granted Sept. 10, 1974, to Peters. The fastening means may consist of corrosion resistant metal bolts or wood rods passing through the stationary landing arms into the flotation.

Another object of the present invention is to provide an inexpensive yet highly durable, rugged, not resistant, maintenance free mooring unit. This object is achieved in the present invention by the utilization of all metal parts being subjected to hot dipped galvanizing after fabrication; the utilization of resilient stretch members resistant to water, ozone, and ultraviolet rays; and the use of protected foam in the form of foam filled tire casings.

Another primary object of the present invention is to provide a space efficient mooring device. For example, the present invention utilizes less space than the beam of the boat which is moored in the device. Therefore, the number of boats that can be moored in a given space is dictated not by the width of the mooring device, but by the beam of the boats moored in the device.

It is a further object of the present invention to allow the mounting of the dock cleats on the fixed or floating base landing structure at any desired spacing to accomodate varying lengths and widths of boats.

Another object of the present invention is to provide a moorage device that is the least likely to cause or allow damage to the boat. This is accomplished here by the utilization of one pressure point on the resilient stretch member which articulates, thus allowing the moored boat, full articulation.

It is a further object of the present invention to provide a mooring device with its own flotation. For example, it will be understood that, whether constructed of metal, wood or some other substance the mooring device weighs a considerable amount and thus when a number of them are placed on one side of a floating base landing structure it tends to cant the floating dock. By utilizing its own flotation, the present invention can not only support its own weight to eliminate the cant but can also be adjusted to utilize the excess flotation as additional flotation for the floating base landing structure. Further, by utilizing its own flotation, the present invention actually acts as an outrigger affording additional stability to the floating base landing structure. Additionally, the flotation acts as a safety bumper protecting the boat, in the unlikely event a boat atempts to dock at to great a speed.

Another primary object of the present invention is cost effectiveness. This is accomplished by the fact that finger piers are no longer required and this device eliminates the necessity of mooring a boat parallel to the fixed or floating base landing structure. Further, the present invention is easily installed and easily moved should the need arise.

These and other features, advantages and characteristics of the present invention will be apparent from the following more detailed description of the preferred embodiments thereof.

DESCRIPTION OF THE PREFERRED EMBODIMENT

Figure 1:
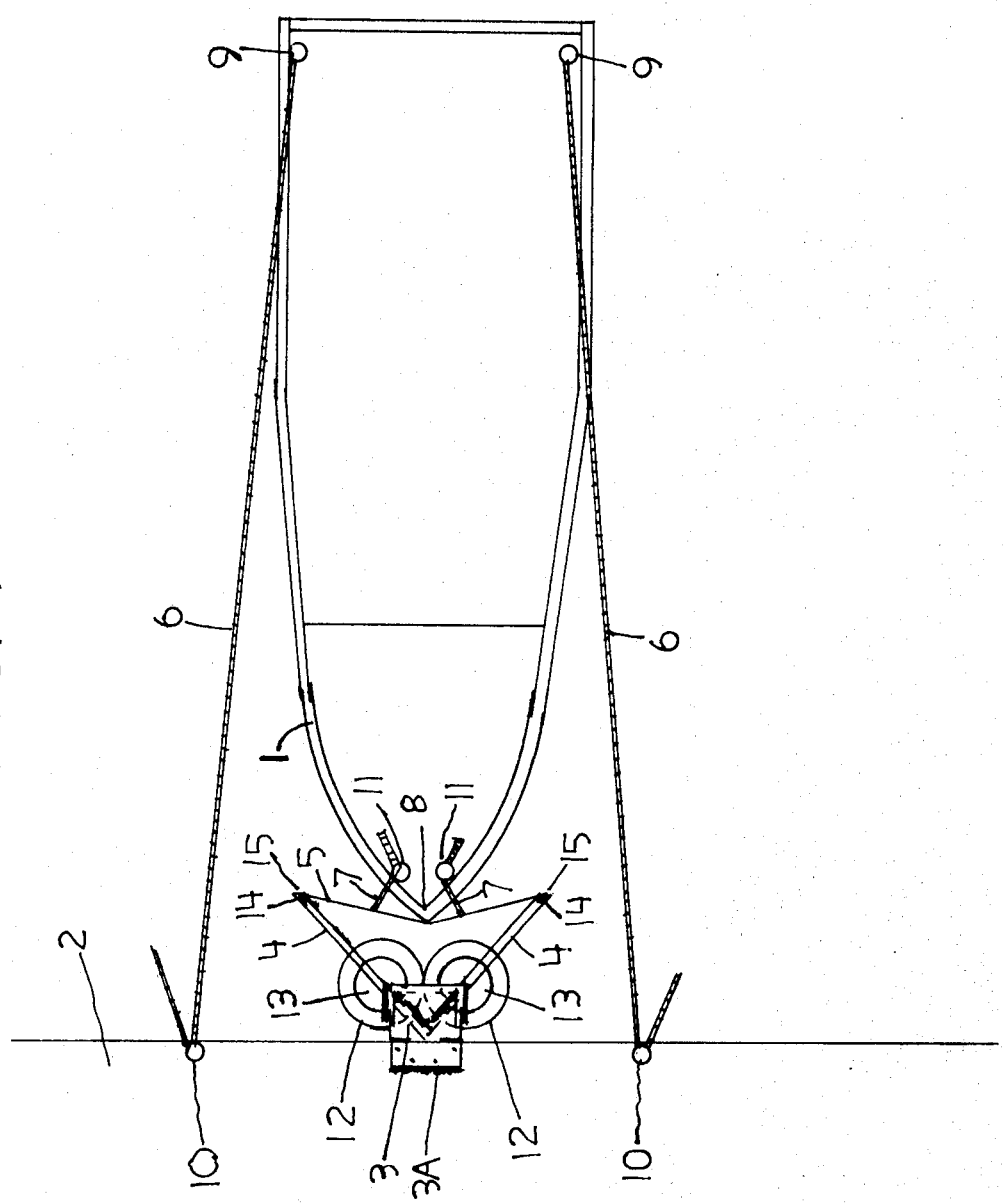
FIG. 1 is a top plan view of a floating or fixed base landing structure with the present invention attached thereto.

Referring now to FIG. 1, it is seen that a boat 1 is moored to a floating or fixed base landing structure 2 which is provided with a height adjustable base 3 and 3A and two stationary landing arms 4 upon which are mounted four stationary landing arm uprights 14. Between the stationary landing arm uprights 14 is a resilient stretch member 5 in the form of a rubber belt of varying width and thickness depending upon the boat weight the unit is designed to accomodate.

The boat 1, is driven against the stretch member 5 and moored with stern lines 6 and bow lines 7. The stern lines 6 are fastened to boat cleats 9 and dock cleats 10 with the windward line made fast first and the leeward line thereafter. This is followed by making fast bow lines 7 which are attached to stretch member 5 and tied to bow cleats 11. One pressure point at 8 and two draw points 9 and 10 are obtained.

Two flotation units 12, each consisting of a pair of tire bodies which are filled with a polymeric foam, as described in Peters patent, and topped with a fiberglass disk 13, or any suitable flotation means, are mounted to the stationary landing arms 4 utilizing corrosion resistant metal bolts. The preferred form of foam filled tire flotation units 12 offers many benefits. First, flotation units 12 compensates for the weight of the mooring device, hence no additional weight to lower the freeboard on the mounted side of a floating base landing structure 2. Secondly, the flotation units 12 act as an outrigger for increased floating landing base structure stability. Third, the flotation units 12 act as a protective bumper for the incoming boat in the event the docking speed is to great for the capabilities of resilient stretch member 5.

Figure 2:
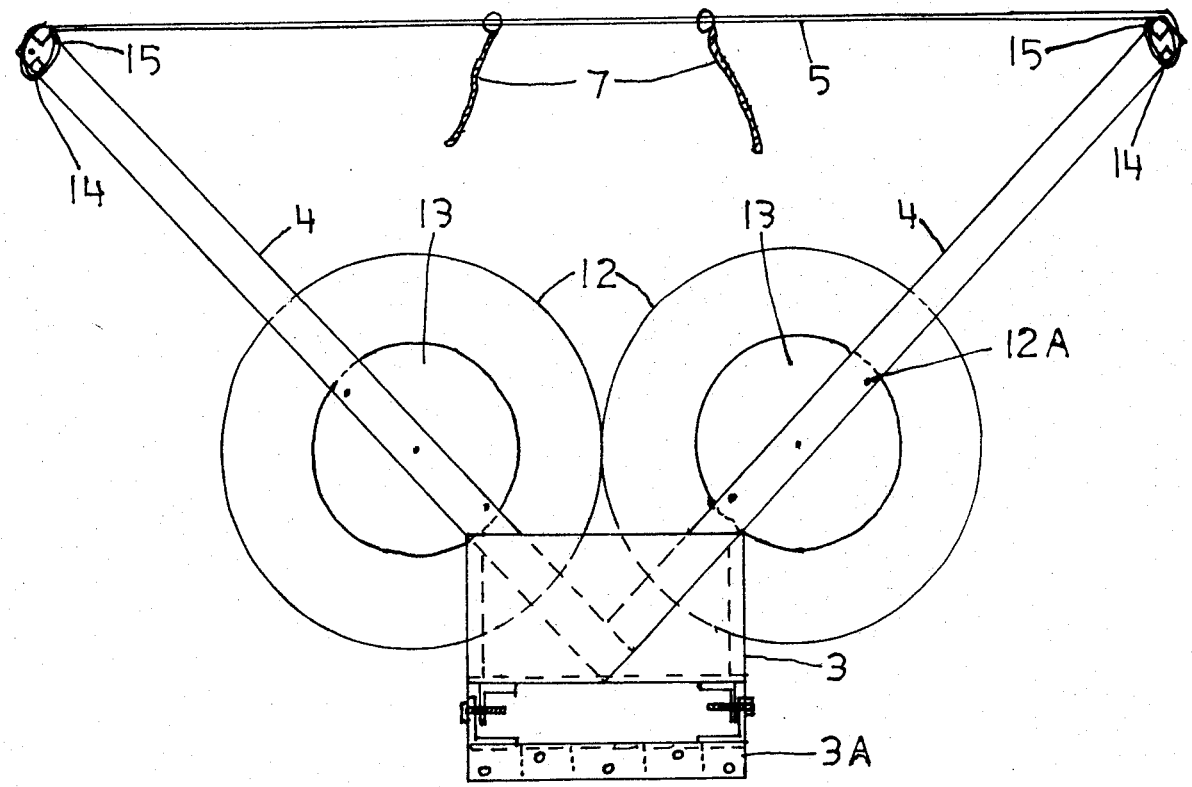
FIG. 2 is a top plan view of the main body of the mooring device.
Figure 3:
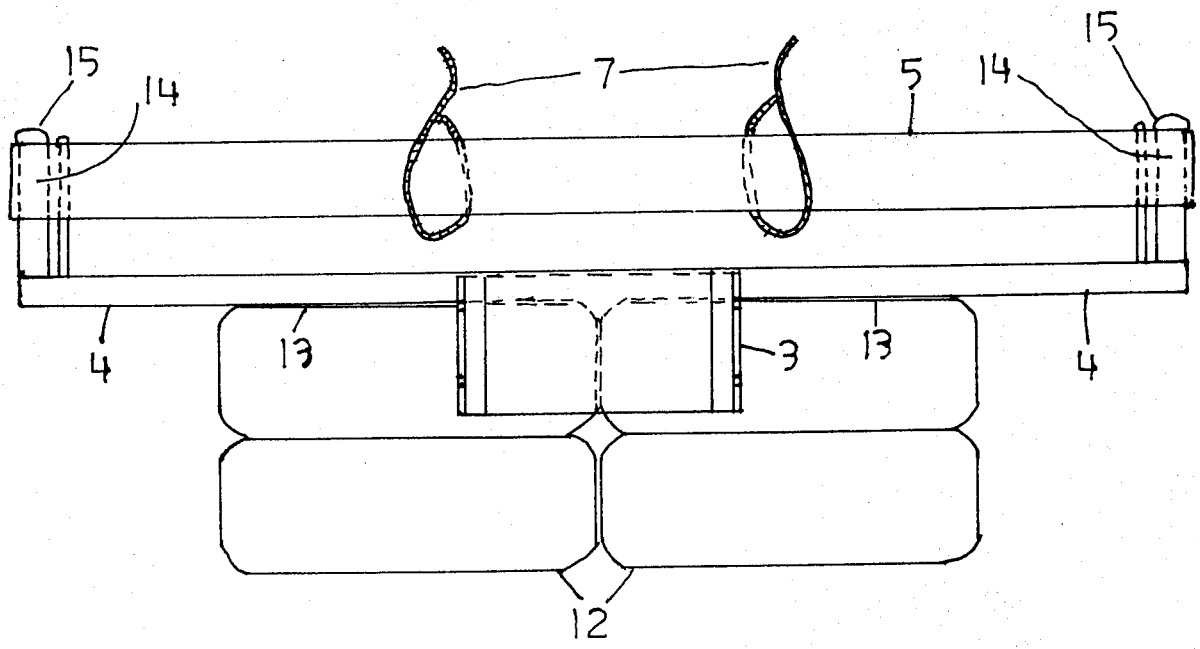
FIG. 3 is an end view of the main body of the mooring device as seen from the fixed or floating base structure.
Figure 4:
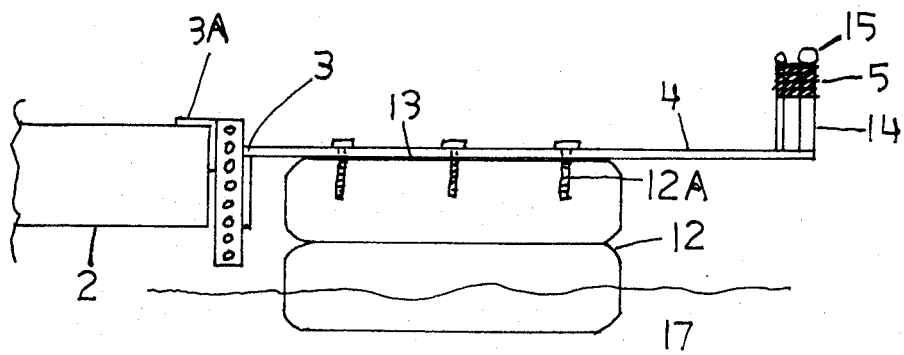
FIG. 4 is a side view of the main body of the mooring device illustrating the vertical adjustment features.

Referring now to FIGS. 2, 3 and 4, the actual mooring device is shown diagrammatically for clarity.

As seen, base 3A is permanently affixed to the fixed or floating base landing structure 2. The adjustable base 3, is attached to base 3A utilizing corrosion resistant metal bolts, thus allowing for future vertical adjustment of the unit. Permanently affixed to adjustable base 3 are the stationary landing arms 4. Permanently affixed to the stationary landing arms 4 are four stationary landing arm uprights 14 affixed perpendicular to the stationary landing arms. Also attached to the stationary landing arms 4 are two flotation units 12 covered by a fiberglas disk 13 and mounted utilizing lag screws or metal bolts 12A. Stretched between the stationary landing arm uprights 14 is a resilient stretch member 5 which has attached to it bow lines 7. Additionally, the stationary landing arm uprights 14 have affixed to them on the top protective bumpers 15, designed to protect the boat in case of collision. Water line 17 is shown in relation to flotation units 12 to further illustrate the mooring device in place in the water.

Figure 5:
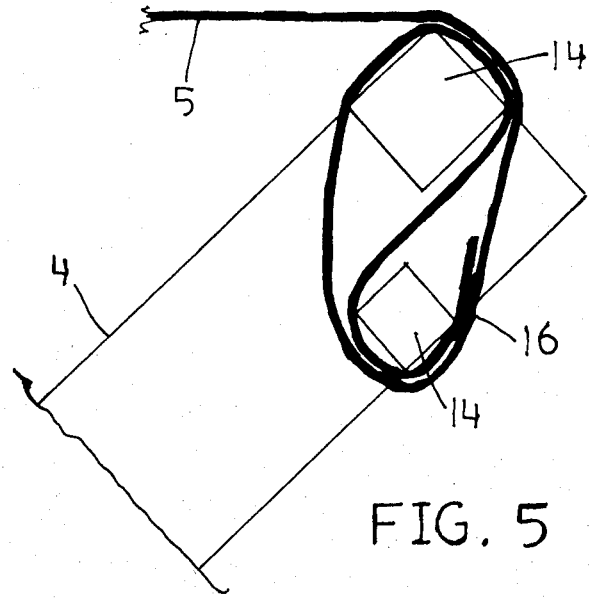
FIG. 5 is an exploded view of the end of a stationary landing arm with the stationary landing arm uprights and the resilient stretch member attached thereto.

Referring now to FIG. 5, it is seen that the resilient stretch member 5 is attached to the stationary landing arm uprights 14 by means of tape 16 and the method in which the resilient stretch member is woven around the stationary landing arm uprights 14, coupled with the fact that when installed, the resilient stretch member 5 is under tension.

Figure 6:
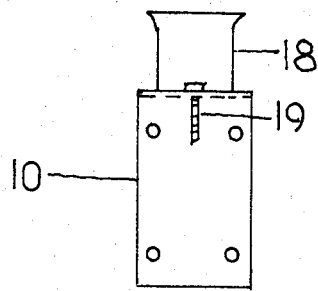
FIG. 6 is an end view of the dock cleat.
Figure 7:
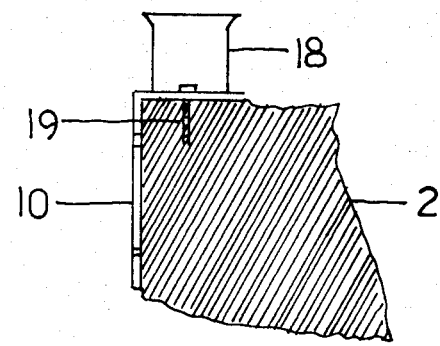
FIG. 7 is a side view of the dock cleat mounted to a fixed or floating base landing structure.

Referring now to FIGS. 6 and 7, it is seen that dock cleat 10 is metal angle iron with a welded mushroom shaped top 18 mounted to the floating or fixed base landing structure 2 with lag screws 19.

From the foregoing, various further applications, modifications and adaptions of the apparatus disclosed by the foregoing preferred embodiments of the present invention will be apparent to those skilled in the art to which the invention is addressed, within the scope of the following claims.

What is claimed is:

1. A vertically adjustable, variable buoyancy basic mooring device for boats which device secures the bow of the boat to a resilient stretch member allowing full articulation while at the same time preventing pivotal movement of the stern of the boat in response to wind and wave forces acting on the boat comprising:

a fixed or floating base landing structure including a base unit, said base unit being rigidly affixed to said fixed or floating base landing structure, attached to the base unit is a vertically adjustable base which includes stationary landing arms which are rigidly affixed to said vertically adjustable base, and positioned at the end of said stationary landing arms are four rigidly affixed stationary landing arm uprights, between which is positioned a resilient stretch member.

a flotation unit or units attached to the stationary landing arms which when positioned in the water as a result of adjusting the vertically adjustable base, offers buoyancy equal to or in excess of the weight of the total mooring device, wherein the bow of the boat is positioned against the resilient stretch member causing deflection of said stretch member at which time lines from opposite sides of the stern of the boat are attached to two docks cleats which are mounted on the fixed or floating landing structure at such an angle as to severely restrict pivotal movement of the boat followed by tensioning of the bow lines which are attached at one end of the resilient stretch member and are thus attached at the other end to the bow of the boat.

2. The basic mooring device according to claim 1, wherein the base unit comprises and L-shaped plate member which is adapted to be permanently affixed to the fixed or floating base landing structure.

3. The basic mooring device according to claim 1, wherein the adjustable base unit connection to the base unit is adapted to allow for vertical adjustment.

4. The basic mooring device according to claim 1, wherein the dock cleats are mounted on the fixed or floating base landing structure so as when tensioned via stern lines, severely restrict pivotal action of the boat when subject to wind and wave action.

5. The basic mooring device according to claim 1, wherein the flotation units are foam filled tire casings.

6. The basic mooring device according to claim 1, wherein the flotation units are any type of a buoyancy unit with flotation capabilities equal to or in excess of the weight of the basic mooring device.

7. The basic mooring device according to claim 1, wherein the bow lines are permanently attached to the resilient stretch member.

8. The basic mooring device according to claim 1, wherein a fiberglas disk is located between the stationary landing arms and the flotation units.

9. The basic mooring device according to claim 1, wherein the mooring device is mounted to the fixed or floating base landing structure perpendicular to its outer edge.

10. The basic mooring device according to claim 1, wherein the stationary landing arm uprights are capped with a rubber protective bumper.

11. The basic mooring device according to claim 1, wherein the stationary landing arms are capped at their ends with a rubber protective bumper.

* * * * *